United States Patent [19]

Isaka

[11] Patent Number: 5,168,488
[45] Date of Patent: Dec. 1, 1992

[54] OPTICAL RECORDING AND REPRODUCING APPARATUS

[75] Inventor: Kazuo Isaka, Odawara, Japan

[73] Assignee: Hitachi, Ltd., Tokyo, Japan

[21] Appl. No.: 413,855

[22] Filed: Sep. 28, 1989

[30] Foreign Application Priority Data

Oct. 3, 1988 [JP] Japan .................. 63-247474

[51] Int. Cl.⁵ .............................................. G11B 7/00
[52] U.S. Cl. ...................................... 369/47; 369/54; 369/44.25; 369/44.34
[58] Field of Search .................. 369/47, 48, 54, 116, 369/44.26, 44.25, 44.34, 44.31, 53

[56] References Cited

U.S. PATENT DOCUMENTS

| | | | |
|---|---|---|---|
| 4,553,228 | 11/1985 | Gerald et al. | 369/44.34 |
| 4,564,929 | 1/1986 | Yonezawa et al. | 369/44.26 |
| 4,672,596 | 6/1987 | Romeas et al. | 369/59 |
| 4,685,096 | 8/1987 | Romeas | 369/47 |

FOREIGN PATENT DOCUMENTS

| | | |
|---|---|---|
| 0232867 | 8/1987 | European Pat. Off. . |
| 61-13450 | 1/1986 | Japan . |
| 62-143276 | 6/1987 | Japan . |
| 62-173674 | 7/1987 | Japan . |

Primary Examiner—Dale M. Shaw
Assistant Examiner—Khoi Truong
Attorney, Agent, or Firm—Kenyon & Kenyon

[57] ABSTRACT

In an optical disk apparatus for recording and reproducing data using light beams, the light reflected from a record mark area provided on an optical disk is detected and the amplitude of the signal corresponding to the light is held; the record mark is composed of long pits and long unrecorded areas. This amplitude is compared with that of the signal relative to the light from a data recording area of the optical disk. If the comparison result has a predetermined relation between both signals, an output signal with a prescribed level is produced. This output signal is used to assure the quality of the recorded data.

11 Claims, 2 Drawing Sheets

FIG. I

OPTICAL RECORDING AND REPRODUCING APPARATUS

BACKGROUND OF THE INVENTION

The present invention relates to an optical recording and reproducing apparatus and more particularly to a circuit for assuring the quality of information to be recorded in an optical disk device as such an apparatus.

In an optical disk device in which the read/write of information is performed using a light beam, it is a common technique to detect the amount of light reflected from an optical disk to set the write level of information or detect the dirty state in an optical system and the optical disk due to dust or the like.

Japanese Patent Application JP-A-61-13450 is related to an optical disk device.

In this prior art, the amount of light reflected from the optical disk is detected as a signal in a detector (photo-electric converter), the detected signal is amplified to provide an output voltage and the output level. Then, if the output voltage is lower than a constant level, i.e. the amount of the reflected light is less than a predetermined amount, this fact is provided as detection information to a user of the apparatus.

More specifically, the above prior art is composed of a photo-electric converter, a D.C. amplifier and a comparator. The reflected light form the optical device is converted into current by the detector (e.g. photo-electric converter); the current is amplified by the D.C. amplifier to provide an output voltage corresponding to the light amount of the reflected light; and this output signal is compared with a signal having a predetermined level by the comparator. Then, if the output signal is lower than the signal having the predetermined level, this fact is provided to a user as detection information.

Generally, the level of the detected signal based on the reflected light varies depending on the type of optical system, e.g., optical disk, etc. The above prior art does not take into consideration large variations in the light reflection factor of the optical disk, the light detection sensitivity, the gain of the D.C. amplifier, etc. Therefore, in order that the prior art can assure the quality of the recorded data also in the case where there are the above variations, it is necessary to set the detection level of the reflection light at a considerably high level. Thus, as the case may be, quality of the recorded data will be higher than is necessary and possibly useful media will be excluded.

SUMMARY OF THE INVENTION

The present invention provides an optical recording and reproducing apparatus which can assure the quality of the recorded data (information) regardless of any variation in the light reflection factor of a recording medium, the light detection sensitivity of a detector, the gain of a D.C. amplifier, etc.

The present invention can be applied to many optical systems, e.g. an optical disk device. The amplitude of the signal relative to the light reflected from a certain area of an optical disk having many tracks as a recording medium is previously stored; the certain area is composed of long pits of prescribed marks (e.g. sector mark) provided on the optical disk and long unrecorded areas thereof. The stored amplitude is compared with the amplitude of the signal relative to the light reflected from the data area of the optical disk. Then, the quality of the recorded data can be assured by detecting that the amplitude of the signal from the data area is in a predetermined relation with the stored amplitude i.e., the former is smaller than the latter. The amplitude of the signal relative to the reflection light from the predetermined mark (sector mark) of the optical disk is converted into a voltage signal which is held in the state charged in a capacitor. The amplitude of the signal relative to the light reflected from the data area is also converted into a voltage signal and compared with the voltage signal held in the capacitor. On the basis of the comparison result, it is possible to assure the quality of the recorded data so that the amplitude of the signal relative to the reflected light from the data area is always larger than a predetermined value.

An incomplete pit can be made on the optical disk due to the shortage of the power in recording data on the optical disk, the adhesion of dust to an optical head, cracks of the optical disk, etc. In this case, the change in the amount of the light reflected from that portion, which is detected by the detector, is reduced. Therefore, by comparing that change with the change in the light amount at the area composed of the long complete pits and the long unrecorded areas previously made, it is possible to easily detect an incomplete pit.

Moreover, in accordance with the present invention, variations in the light reflection factor of the optical disk, the diameter of the light beam for read, the detection sensitivity of the detector equally act on both complete and incomplete pits, so that these variations can be disregarded. Thus, the poor record can be detected at high accuracy. As a result, it is possible to control the recorded data so that it has high quality.

Additionally, the present invention may be applied to not only an optical device but also an apparatus for optically recording and reproducing information, e.g., an apparatus for recording and reproducing information on an optical card.

DETAILED DESCRIPTION

Figure 1:
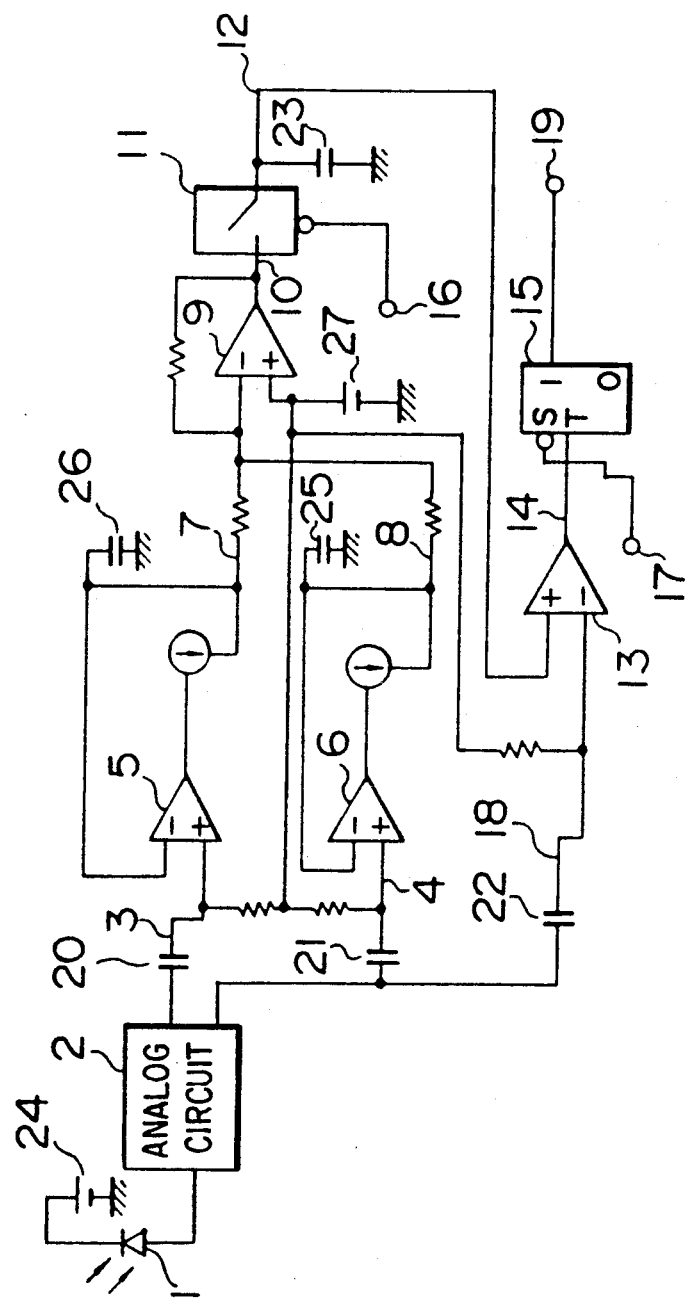
FIG. 1 is a block diagram of one embodiment of a read-out circuit of the optical disk device according to the present invention.

Now referring to FIGS. 1 to 3, one embodiment of the present invention will be explained.

Although an optical disk device is not illustrated, light beam emitted from a light source such as a semiconductor laser is guided through an optical system to be radiated to a selected track of an optical disk. The light beam reflected from the optical disk is guided again through the optical system to a detector 1 in FIG. 1. This detector 1 or a separately provided detector detects the data (data area) previously recorded on the optical disk to provide reproduced data. The detector also provides a tracking signal and a focusing signal. On the other hand, in recording data on the optical disk, the light beam modulated in accordance with the data to be recorded is emitted from the semiconductor laser and guided through the optical system to the optical disk. Then, thermal change, for example, is generated on a certain selected track of the optical disk to form small, so called, pits, thereby recording data (data area).

In one embodiment of the present invention, the amplitude of the reflection signal from the record mark area composed of long marks and long, unrecorded area is held in a capacitor 23 as stored charge that provides a hold voltage. The amplitude of the reflection signal from the data area on the optical disk is compared with the above hold voltage by a comparator 13. Then, if the former is smaller than the latter, a detection signal 19 is produced from a flip-flop 15.

Figure 3:
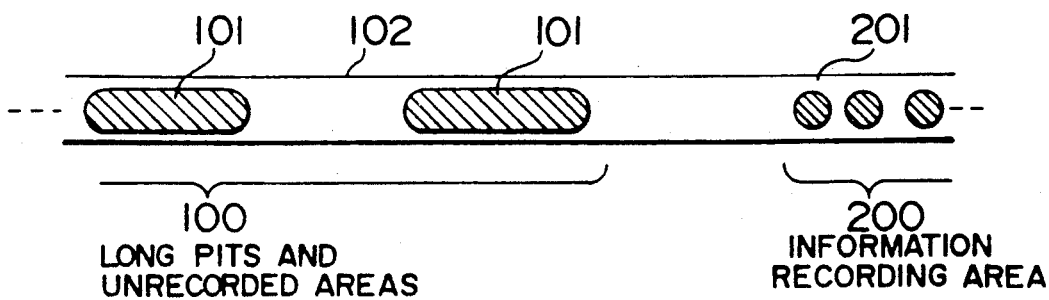
FIG. 3 is a view showing the recording marks used to produce an amplitude holding voltage on an optical disk.

The record mark area 100, which produces the above hold voltage, as shown in FIG. 3 is composed of a plurality of long pits 101 and a plurality of long unrecorded areas 102 which are alternately arranged on a certain track; such a record mark area 100 may be formed previously, in front of an information recording area 200, by a stamper, or the like. In the case of a write-once optical disk, each of a plurality of tracks is composed of a plurality of data blocks and sector marks indicative of boundaries between the blocks. These sector marks can be used as the record mark area 100. On the other hand, the information recording area can be a series of small pits 201 on each of the tracks of the optical disk.

Now referring to the timing chart of FIG. 2, explanation will be given for the operation of one embodiment of the present invention shown in FIG. 1. Respective waveforms in FIG. 2, which are labeled with the same reference numerals as the corresponding portions in FIG. 1, show the waveforms of the signals produced at those portions in FIG. 1.

Figure 2:
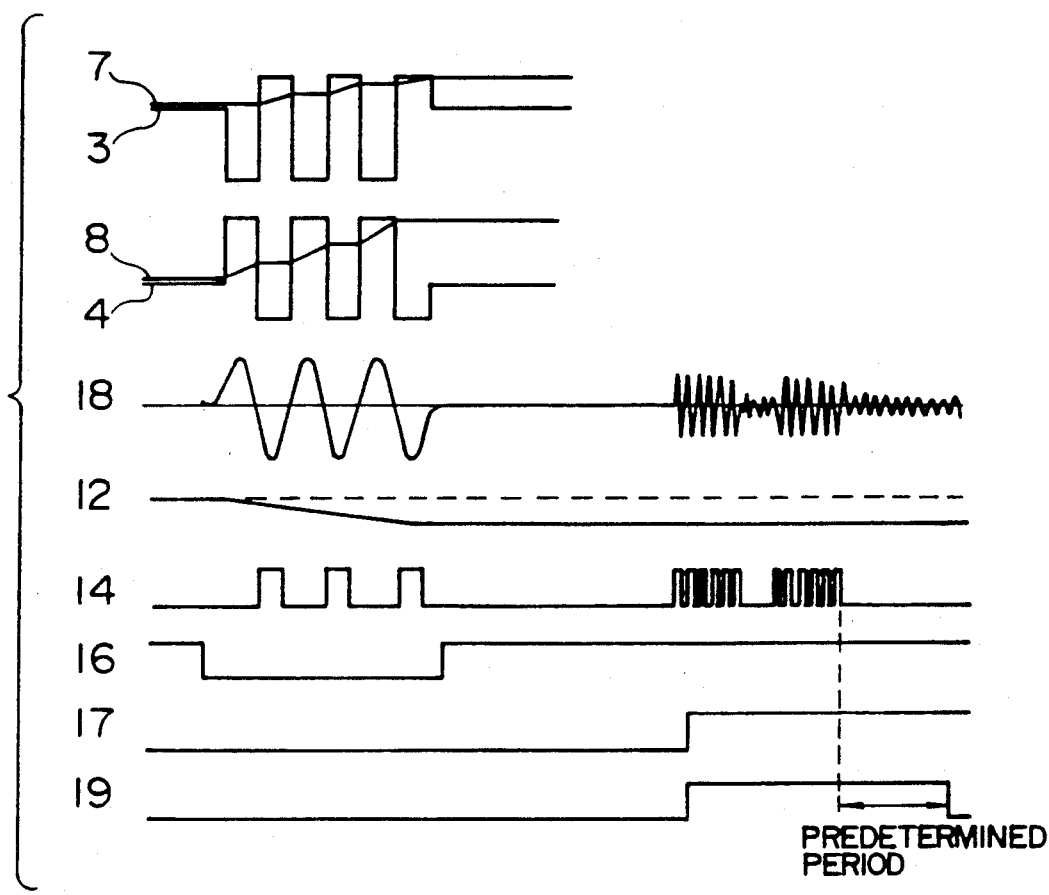
FIG. 2 is a timing chart for explaining the operation of the device of FIG. 1.

Now it is assumed that the detector 1 in FIG. 1 has started to detect the reflection light from the record mark area 100 on the optical disk which is composed of long pits 101 and long unrecorded areas 102 as shown in FIG. 3. The detector 1, which is driven by a voltage source, detects the reflection light and provides a current signal proportional to the reflection light to an analog circuit 2. The analog circuit 2 converts the current signal into a voltage signal, which is amplified and outputs as differential voltage signals 180 degrees out of phase from each other. Incidentally, the above detector 1 and analog circuit 2 may be also those commonly used for data detection.

The differential outputs from the analog circuit 2 pass through coupling capacitors 20 and 21, which have a long time constant, to provide signals 3 and 4 which are supplied to one input of each of comparators 5 and 6. Also one of the differential outputs pass through a coupling capacitor 22 with a short time constant to provide a signal 18 which is supplied to a comparator 13. The capacitance of the capacitors 20 and 21 is set to have such a value as is large enough to sufficiently pass signals corresponding to changes in the reflection light from the long pit to long unrecorded area of the record mark area 100. The capacitance of the capacitor 22 is set to have such a value as is small enough to remove signals having frequencies lower than the frequency band of the data area 200. A voltage source 27 is used to provide a voltage for deciding the operating points of the above signals 3, 4 and 18.

The comparator 5 detects that the amplitude hold voltage 7 which is an output therefrom does not still reach the peak value of the signal 3. Thus, it operates a constant current circuit to supply a charging current to a capacitor 26. Hence, the capacitor 26 is charged to the amplitude hold voltage 7 which has reached the peak value of the signal 3, and holds it. Likewise, the comparator 6 causes a capacitor 25 to hold the amplitude hold voltage 8 which has reached the peak value of the signal 4. Although these amplitude hold voltages 7 and 8 contain D.C. components, they are added thereby to remove or offset the D.C. components. Thus, there is provided an amplitude hold voltage 10 corresponding to the amplitude of the reflection light from the recorded mark area 100, which is supplied through an analog switch 11 to a capacitor 23 and held there. The analog switch 11 is controlled to be 'on' by a signal 16 only while the detector 1 detects the data read from the data recording area 200 of the optical disk. Therefore, while the analog switch 11 is 'on', the amplitude hold voltage is shifted to the capacitor 23 and after the analog switch 11 is turned 'off', the amplitude hold voltage 10 is held in the capacitor 23 as an amplitude hold voltage 12. The amplitude hold voltage 12 is obtained with negative polarity since the amplitude hold voltage 10 is the inversion output of an operational amplifier 9. The capacitor 23 is required to hold the amplitude hold voltage 12 for a long time and so has a capacitance large enough to stabilize the amplitude hold voltage 12 for that time.

The amplitude hold voltage 12 thus obtained is sent to the comparator 13. When the data recording area 200 is read by the detector 1 and the analog circuit 2, the amplitude hold voltage 12 is used as a reference signal for deciding whether or not the amplitude of the reflection light from the data recording area 200 is larger than a prescribed value.

A detection signal relative to the reflection light from the data recording area 200 is provided as the signal 18 as mentioned above which is supplied to the comparator 13. The comparator 13 compares the signal 18 with the signal 12 (the amplitude hold voltage 12 with a negative polarity). Then, if the signal is smaller than the signal 12, i.e. the absolute value of the former is larger than that of the latter, the comparator 13 provides an output signal 14 at a high level.

A retriggerable flip-flop 15, in response to a signal 17 indicative of the data recording area 200 the quality of which is to be used and the high level output signal 14 from the comparator 13, provides a high level output signal 19 and holds it. Namely, when the signal 17 is boosted to a high level and thereafter the signal 14 is also boosted to a high level, the retriggerable flip-flop 15 is set to provide the output signal 19 at a high level; when the signal 14 at a high level is not provided for a predetermined time from the comparator 13, the retriggerable flip-flop 15 lowers the output 19 to a low level, which indicates that the signal 18 read from the data recording area 200 has been decreased to a predetermined level. The above amplitude hold voltage 12 is set to update its value whenever the record mark area 100 is read, and the updated value is compared with the level of the signal read from the subsequent data recording area 200.

The change of the signal 19 to a low level can be used as a warning signal for assuring the quality of the recorded data. For example, as disclosed in JP-A-62-173674, in response to the decrease of the signal level 19, the data is rerecorded at an alternative area. Otherwise, the signal 19 is connected with a driver and LED (light emitting diode). When the level of the signal 19 is lowered, a warning lamp is lit to inform a user of this fact. Then, the user or a maintenance man cleans the optical head or checks the amount of the light emitted from the laser. Moreover, it is possible to stop the recording operation, treating the reduced signal as being indicative of the device abnormality. Furthermore, as disclosed in JP-A-62-143276, the signal 19 can be used to operate an optical disk cleaner, thereby causing the cleaner to clean the optical disk.

In accordance with this embodiment, the signal 19 can be used as a warning signal so that the quality of the recorded data on the, optical disk, can be assured without excess quality requirements for the disk.

Additionally, as mentioned above, the area used to generate the amplitude hold voltage may be the sector marks or the record mark area, composed of long pits and long unrecorded areas, arranged in front of the data recording area or a dedicated area of each track, as shown in FIG. 3. However, it should be noted that in the case where the dedicated mark is to formed without using the sector mark, the length of the long pits and the long unrecorded areas can be set at a larger value. In this case, the time period at the peak position of the signals 3 and 4 in the embodiment of FIG. 1 can be increased so that the holding accuracy of the amplitude hold voltages 7 and 8 can be improved.

What is claimed is:

1. An information recording and reproducing system having a recording medium which is radiated by a light beam for recording and reproducing, comprising:

said recording medium including a first area in which the information may be recorded by the light beam, and a second area including a preformed mark and a non-recorded portion;

means for detecting a difference in reflected light between light reflected from said preformed mark in said second area and said non-recorded portion of said second area;

means for holding an amplitude signal indicative of said difference in reflected light;

means for detecting an amplitude of light reflected from said first area;

means for comparing said amplitude of the light reflected from said first area with said amplitude signal indicative of said difference in reflected light held in said means for holding; and memory means for storing an output signal if the comparison result has a predetermined relation, said output signal being indicative of quality of information recorded in said first area.

2. The system according to claim 1, wherein said means for detecting a difference detects when said reflected light is reflected from said preformed mark and wherein said means for holding resets the signal to be held whenever said reflected light from said preformed mark is detected.

3. The system according to claim 1, wherein said output signal is indicative of a warning that information should not be recorded when the comparison result in said comparing means has a predetermined relation.

4. An information recording and reproducing system having a recording medium which is radiated by a light beam, said recording medium comprising an optical disk having a plurality of tracks, each of said tracks composed of a plurality of blocks and a boundary region between adjacent blocks, said boundary region having prescribed marks and a non recorded portion, wherein information is recorded on a certain block of a selected track, comprising:

a detector for detecting a difference in light reflected from said prescribed marks and from said non recorded portion;

means for holding a signal indicative of said difference in reflected light;

means for detecting an amplitude of light reflected from one of said blocks;

a comparator for comparing said amplitude obtained from said block with said signal indicative of said difference in reflected light held in the means for holding; and means for providing an output signal when the comparison result in said comparator has a predetermined value, said output signal being indicative of quality of information recorded in said block.

5. The system of claim 4, wherein said means for holding comprises a capacitor which serves to hold the amplitude of the signal obtained from said detector, and said comparator compares said signal held by said holding means and said amplitude obtained from said block obtained from said detector.

6. The system of claim 4, wherein each said mark comprises a long pit and said boundary region is composed of a series of said prescribed marks and unrecorded areas which are alternately arranged.

7. The system of claim 6, wherein said means for holding comprises a capacitor which serves to hold an amplitude of said signal indicative of a difference obtained from said detector, and said comparator compares the amplitudes of said signal indicative of a difference and light from said block.

8. The system of claim 7, wherein if the comparison result in said comparator indicates such a relation that the amplitude of the signal obtained from said boundary region is larger than that of the signal obtained from the certain block, said means for providing an output signal provides an output signal having a level different from that of an output signal before such an indication.

9. The system of claim 4, wherein said means for providing an output signal further receives a signal indicative of whether a light beam is radiating the boundary region or the block for recording information.

10. The system of claim 9, wherein said means for holding holds the amplitude of said signal indicative of a difference obtained from said detector, and if the comparison result in said comparator indicates such a relation that the amplitude of the signal obtained from the boundary region is larger than that of the signal obtained from the certain block, said means for providing an output signal provides an output signal having a level different from that of an output signal before such an indication.

11. The system of claim 10, further comprising means, responsive to said output signal, for supplying a warning to a user when said output signal indicates that information should not be recorded on the block.

* * * * *